Jan. 15, 1963 F. W. SCHÖLLHAMMER 3,073,253
LUBRICATION SYSTEM
Filed March 12, 1956

INVENTOR
FRIEDRICH W. SCHÖLLHAMMER

BY Dicke and Craig.

ATTORNEYS

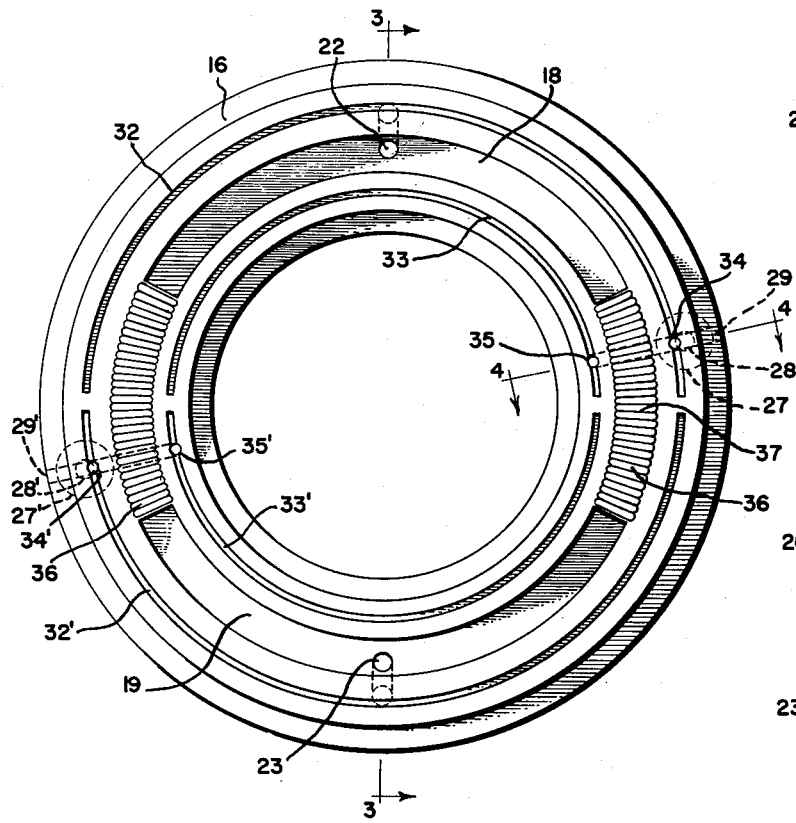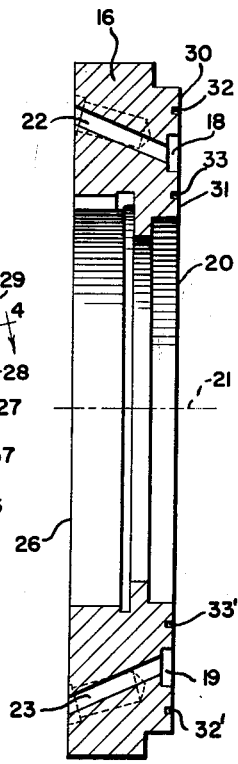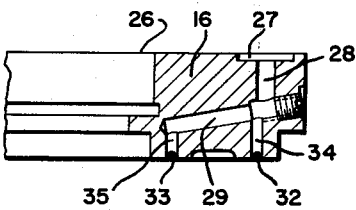

Jan. 15, 1963  F. W. SCHÖLLHAMMER  3,073,253
LUBRICATION SYSTEM
Filed March 12, 1956  3 Sheets-Sheet 3
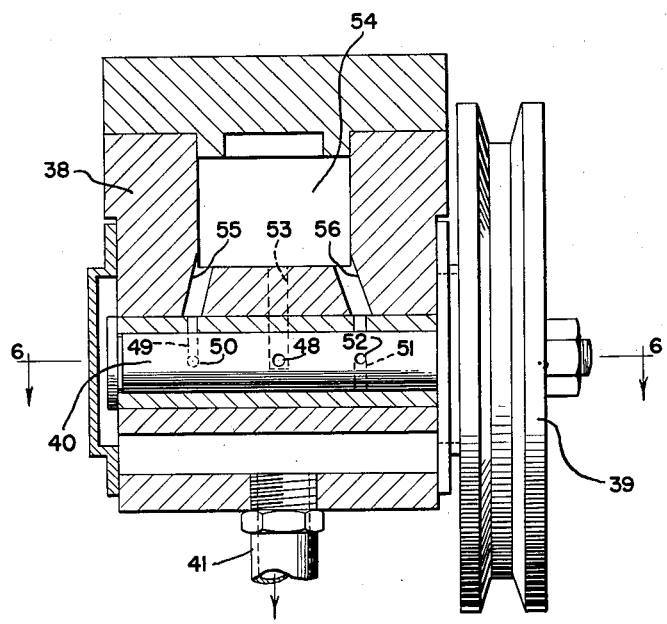
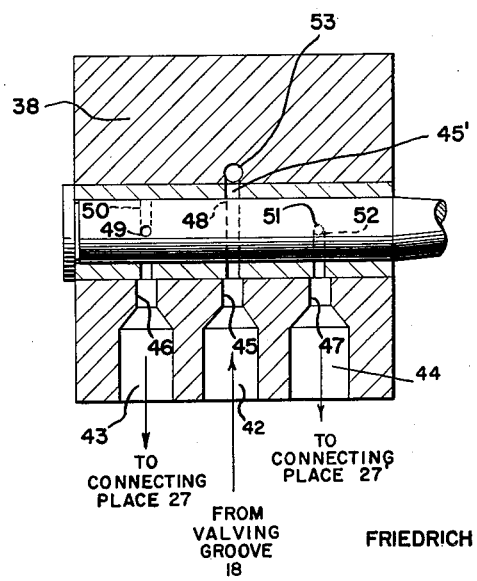
INVENTOR
FRIEDRICH W. SCHÖLLHAMMER
BY *Dicke and Craig*
ATTORNEYS

United States Patent Office 3,073,253
Patented Jan. 15, 1963

3,073,253
LUBRICATION SYSTEM
Friedrich W. Schöllhammer, Stuttgart-Bad Cannstatt, Germany, assignor to Daimler-Benz Aktiengesellschaft, Stuttgart-Unterturkheim, Germany
Filed Mar. 12, 1956, Ser. No. 570,827
Claims priority, application Germany Mar. 14, 1955
4 Claims. (Cl. 103—162)

The present invention relates to a method and apparatus for lubricating two surfaces which are exposed to mutual high pressure loads and to simultaneous relative displacement, for example, relative rotation, and more particularly, to a method and apparatus for lubricating the control valving surfaces of a rotary barrel unit of a hydrostatic transmission.

In connection with the lubrication of two surfaces which are subjected mutually to high pressure loads and are simultaneously movable relative to one another, for example, which are rotating with respect to each other, it is necessary that a sufficient amount of lubricating oil be introduced between these two surfaces so that dry friction therebetween is avoided as much as possible, especially during starting or with low rotational speeds or under other unfavorable conditions caused, for example, by a particularly high pressure load. However, when adequate lubrication is provided for the most unfavorable operating conditions, that supply of lubricant is excessive for normal operating conditions, thereby resulting in a large amount of lubricant leakage and a reduction in efficiency under normal operating conditions.

It is one of the principal objects of the present invention to provide a lubricating system for the control valving surfaces that is effective under both normal and unfavorable operating conditions and which does not result in leakage of lubricant and reduced efficiency under normal operating conditions. This object is achieved by the provision of both a normal lubricating system and an auxiliary lubricating system, which supplies metered quantities of lubricant under pressure to the valving surfaces to augment the normal lubrication system under unfavorable operating conditions. These additional quantities of pressure oil are particularly effective for the successful operation of the device during starting and other unfavorable sliding or load condition. In connection therewith, the additional lubricating oil may be supplied to the high pressure sealing surfaces separately from the main lubrication system, for example, by means of a special separate oil pump which offers the advantages of an optional and arbitrary engagement and disengagement of the additional auxiliary oil lubrication. However, especially in the application of the present invention to the control valving surfaces of an axial piston unit of a hydrostatic transmission in which the control valving surfaces must be sealed in the axial direction, the oil for the additional lubrication may also preferably be taken or branched off intermittently from the oil circulatory system of the hydrostatic transmission whereby the quantity of additional lubricating oil depends on the oil pressure which exists at the valving surfaces of the associated axial piston unit.

The auxiliary lubrication system is used with a conventional axial piston pump unit comprising a rotary cylinder block and a stationary valving surface. The cylinder block is provided with a plurality of axial cylinders, each of which opens onto an end surface of the cylinder block which mates with the stationary valve surface. The stationary valve surface is provided with an inlet and an outlet passage, each of which is surrounded by a semi-annular shallow groove or recess forming the normal lubrication system. These grooves are supplied with the same fluid that is being pumped. The auxiliary lubrication system comprises additional semi-annular grooves or recesses formed in the stationary valve surface to each side of the semi-annular inlet and outlet grooves. These auxiliary grooves are supplied with metered quantities of lubricant under pressure.

Accordingly, it is an object of the present invention to provide a lubrication system adequate under all operating conditions for surfaces which are subjected to high pressure loads and which are also movable relative to one another.

It is another object of the present invention to provide a lubrication system for surfaces subjected to high pressure loads and simultaneous relative movement which responds to the requirements for lubrication under the most adverse conditions, such as during starting or other unfavorable conditions.

It is still another object of the present invention to provide a lubrication system consisting of a normal lubricating system and of an additional, auxiliary lubricating system for the sealing surfaces, for example, of an axial piston unit which are subjected to high pressure loads and undergo simultaneous relative movement, in which the normal lubrication system supplies the oil necessary for ordinary operating conditions while the additional auxiliary lubrication system supplies the lubricating oil necessary under the more adverse operating conditions such as during starting or low rotational speeds.

It is a still further object of the present invention to provide an additional auxiliary lubricating system in addition to the main lubricating system for the valving surfaces of an axial piston type unit, for example, of a hydrostatic transmission, which supplies sufficient amount of oil in a particularly appropriate manner to overcome the inadequacies of the main lubricating system due to unfavorable conditions.

Still another object of the present invention is to provide a simple, rugged and reliable control arrangement for use in connection with the auxiliary lubricating system, in which the metered quantity of additional lubricant is a function of the oil pressure in the pump unit.

In a particularly simple and appropriate arrangement of the additional lubricating system in accordance with the present invention the annular grooves of the auxiliary lubricating system are connected for example, by means of a rotary control valve in predetermined intervals with the high pressure circulation system of the main unit.

Further objects, features and advantages of the present invention will become more obvious from the following description when taken in connection with the accompanying drawing, which shows, for purposes of illustration only, one preferred embodiment in accordance with the present invention and wherein:

FIGURE 2 is an enlarged plan view of the control surface of the valving member of the axial piston unit according to FIGURE 1 in accordance with the present invention.

FIGURE 3 is a cross-sectional view through the valving member according to line 3—3 of FIGURE 2.

FIGURE 4 is a partial cross-sectional view through the valving member according to line 4—4 of FIGURE 2.

FIGURE 5 is a cross-sectional view through a rotary control valve arrangement in accordance with the present invention for supplying the additional oil, and FIGURE 6 is a longitudinal cross-sectional view of the rotary control valve arrangement according to FIGURE 5 along line 6—6 thereof.

Figure 1:
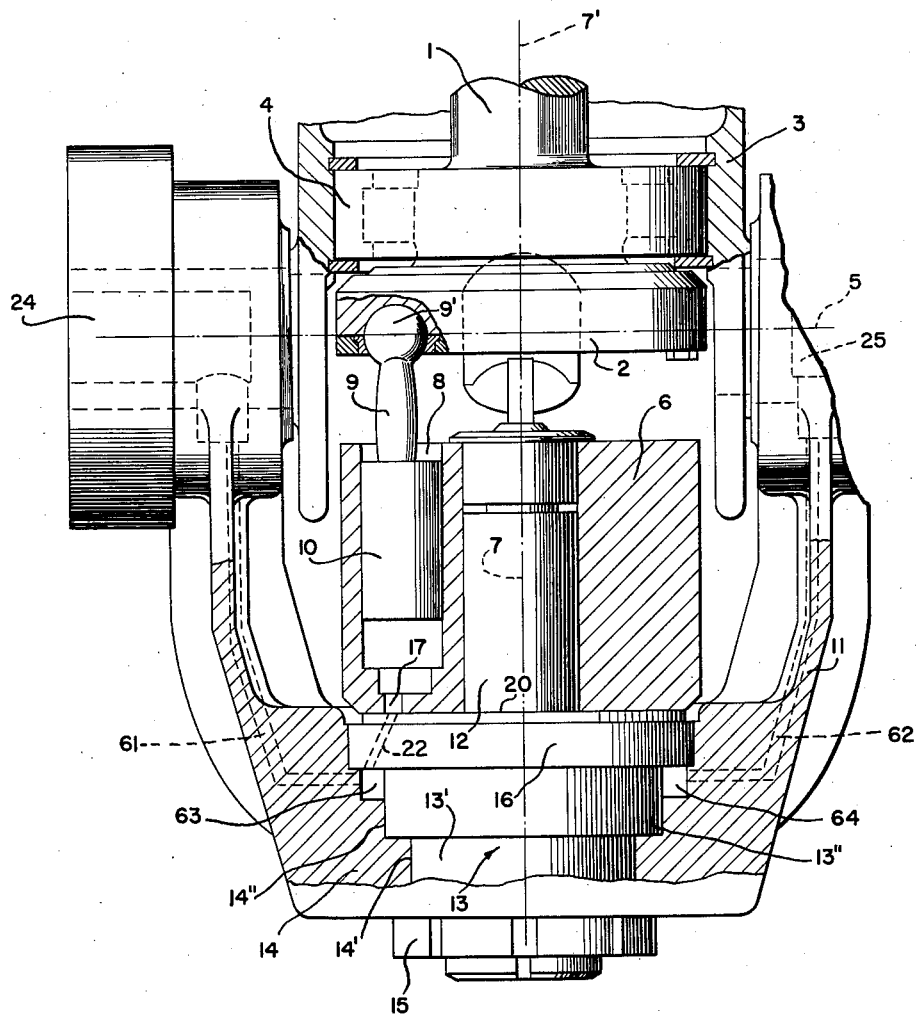
FIGURE 1 is a cross-sectional longitudinal view of an axial piston unit provided with a valving member in accordance with the present invention and taken along the pivot axis of a pivotal housing.

Referring now to the drawing wherein like reference numerals are used throughout the various views to designate like parts and more particularly to FIGURE 1 which represents an axial piston unit, reference numeral 1 designates the main shaft of the axial piston unit. The main shaft 1 is connected with or passes over at the end thereof into a driving flange 2. Immediately ahead of the place where the drive shaft 1 passes over into the driving flange 2, the main shaft 1 is rotatably supported in a stationary housing 3 by means of roller bearing 4. A cylinder block 6 follows the drive flange 2 in the axial direction of the unit, which cylinder block 6 is pivotal about a transverse axis 5 which is disposed in a plane through the driving flange 2. The longitudinal axis 7 of the cylinder block 6 is coaxial with the axis 7' of the main shaft 1 when the cylinder block 6 is in its normal center position. The cylinder block 6 is provided with cylinder bores 8 disposed concentrically to the longitudinal axis thereof which open in the direction of the driving flange 2. A piston 10 is slidably guided in each cylinder bore 8, each piston being provided with a piston rod 9 which is pivotally connected at the upper end thereof to the driving flange 2 by means, for example, of a conventional ball and socket joint formed by the ball-shaped piston rod portion 9' which is supported in a spherically-shaped recess in the driving flange 2. For clarity's sake, only one cylinder bore 8 and only one piston rod 9 is illustrated in FIGURE 1 although it is understood that any appropriate number of cylinder bores, pistons and associated piston rods may be provided.

The cylinder block 6 is surrounded by a further housing 11 which itself is pivotally supported about the aforementioned transverse or cross axis 5 of the stationary housing 3, preferably, on both sides of the axial direction of the main shaft 1. A shaft 12 which serves for support of the cylinder block 6 is simultaneously supported in the housing 11 in such a manner that the longitudinal axis 7 of the cylinder block 6 is coaxial to the axis 7' of the main shaft 1 when the housing 11 is not pivoted or swung out of its normal position. Furthermore, the shaft 12 is not secured directly to the housing 11 but is fastened to an insert member generally designated by reference numeral 13 which in its turn extends through the end closure wall 14 of the housing 11 toward the outside thereof and is secured or clamped thereto by means of a nut 15 which upon tightening thereof from the outside secures the insert member 13 within the housing 11. The insert member 13 is preferably formed in a steplike manner with two portions 13' and 13" of increasing diametric dimensions to be accommodated in appropriately shaped complementary steplike apertures 14' and 14" of the housing 11 so that upon tightening of the nut 15 the insert member 13 is securely fastened to the housing 11. The insert member 13 carries valving member 16 at the end thereof nearer the cylinder block 6. The valving member 16 may be secured to the insert member 13 in any suitable manner, for example, by bolts or the like.

The housing 11 is provided with appropriate bores 61 and 62 which are connected in any suitable manner with the suction and pressure lines of the hydraulic system of the pump unit at the upper ends 24 and 25 thereof. At the lower ends thereof, the horizontal portions of bores 61 and 62 terminate in chambers 63 and 64 of appropriate shapes formed between portion 13" of the insert member 13 and the wall 14 of housing 11. It is understood, however, that the chambers 63 and 64 are separate from each other without any direct fluid communication therebetween.

The valving member 16 which is held stationary with respect to the cylinder block 6 which rotates in the housing 11 during operation of the axial piston unit, cooperates with the connecting oil bores 17 provided in the cylinder block 6 of which one connecting bore 17 each leads to a corresponding cylinder bore 8.

The oil connecting bores 17 in the cylinder block 6 are controlled by two flat-bottomed control valving grooves 18 and 19 of the valving member 16 (FIGURE 2) which valving grooves 18 and 19 are symmetrically arranged on the valving surface 20 of the valving member 16 along a common circular arc with respect to a longitudinal center plane 21 of the valving member 16. Each valving groove 18 and 19 forms an annular segment of the circular arc (FIGURES 2 and 3) and constitutes a reservoir for said oil.

During operation of the axial piston unit, the oil connecting bores 17 associated with respective bores 8 in cylinder block 6 are intermittently connected over the valving grooves 18 and 19 (FIGURES 2 and 3) and the connecting bores 22 and 23, which extend through the valving member 16 at an angle to the axes thereof and which establish a communication between valving grooves 18 and 19 over the chambers 63 and 64 with the bores 61 and 62 respectively which in turn are in fluid communication with the connecting places 24 and 25 of the axial piston unit, suitably arranged coaxial with the axis 5, and therewith in any suitable manner, not illustrated herein, with the oil circulatory system of a hydrostatic transmission containing the axial piston unit. Therefore, the valving grooves 18 and 19 which are supplied with oil from the oil circulatory system of the hydrostatic transmission, provide the normal amount of lubricating oil to the valving surface 20 and thereby constitute the main lubricating system for the sealing surfaces. In other words, the working fluid of the device simultaneously serves as a lubricant whereby a small amount of oil from the rotating sealing surface of the cylinder block 6 is distributed over the two adjacent surfaces. One of the connecting bores 22, 23 constitutes passage means through the valving member 16 providing for the passage of high pressure fluid from the surface 20 to the side of the valving member remote from barrel 6 to bias the valving member toward the barrel.

In addition thereto, the valving surface 20 of valving member 16 is provided with semi annular grooves 32 and 33 and annular grooves 32' and 33', which are relatively smaller than valving grooves 18 and 19 respectively, and which are located radially inside and outside of the circular arc which contains the valving grooves 18 and 19 in the annularly shaped sealing surface 30 and 31 formed directly adjacent the semi annular valving grooves 18 and 19 in the valving surface 20 (FIGURES 3 and 4).

The semi annular grooves 32, 33 and 32', 33' are in communication with the connecting places 27 and 27' provided on the backside 26 of valving member 16 by means of bores 28 and 28' which terminate in bores 29 and 29' respectively. The bores 28 and 28' extend essentially parallel to the axial direction of valving member 16, while the bores 29 and 29' extend essentially radially thereof. The bores 29 and 29' thus lead essentially radially from without to within the valving member 16 and may be closed at the outer ends thereof by suitable closure plugs or the like.

The bores 29 and 29' in turn are in communication with the semi annular grooves, 32, 33 and 32', 33' through oil supply bores 34, 35 and 34', 35' respectively which are arranged within valving member 16 essentially in parallel to the axial direction thereof.

The construction for supplying the lubricant to the semi annular grooves 32 and 33 of the auxiliary additional lubricating system is particularly visible in FIGURE 4 in which axial bore 28, radial bore 29 and axial bores 34 and 35 establish a communication between semi annular grooves 32 and 33, on the one hand, and the connecting place 27 in the back surface 26 of valving member 16, on the other. The diametrically opposite arrangement for semi annular grooves 32' and 33' may be formed similarly.

The connecting places 27 and 27' which may be formed in any suitable manner, for example, by countersunk bores or annular grooves on the backside 26 which must, however, extend over less than 180° each so as to prevent fluid communication therebetween, may be connected in any suitable way with the source of lubricating medium of the auxiliary lubricating system.

As may be seen from FIGURES 2 and 4, small oil chambers 36 are provided along the circular arc which contains the valving grooves 18 and 19. The small, shallow oil chambers 36 are disposed intermediate the spaced ends of the control grooves 18 and 19 in a radial direction and therewith transversely to the gliding movement. The oil chambers 36 which are formed by small recesses are separated from each other by relatively thin radial partition walls 37.

In the embodiment described hereinabove, two connecting places 27 and 27' (FIGURES 2 and 4) provided on the backside 26 of the valving member 16, of which only connecting place 27 is visible in FIGURE 4, are intermittently connected by means of a control valve distributor, to be described more fully hereinafter in connection with FIGURES 5 and 6, with the valving groove 18 forming the pressure side and containing the pressure oil of the valving member 16 so that the additional semiannular grooves 32, 33 and 32', 33' during unfavorable operation of the associated axial piston unit are supplied intermittently with pressure lubricating oil. As a result of the supply of the additional lubricating oil, a slight lifting of the valving surface 20 takes place whereby during the first moments of the starting operation on automatic self-lubrication is initiated by means of the high pressure oil through the control grooves 18 and 19. As the axial contact pressure on the valving surface 20 of an axial piston unit is proportional to the oil pressure in the pressure side of, for example, the oil circulatory system of an hydrostatic transmission, the provision of the additional lubricating system in accordance with the present invention simultaneously assures an appropriate protection against dry friction at the valving surface 20 which might be caused by an excessive axial contact pressure caused, as is well known, by the oil pressure of the circulatory system.

The distributor mechanism for the supply of additional oil is illustrated in FIGURES 5 and 6 and may consist essentially of a housing 38 and one rotary control valve member 40 driven, for example, by any suitable prime mover over the pulley 39 which accommodates the driving belt. In addition to a leakage oil connection 41 (FIGURE 5) disposed in the lower part of the housing 38 for leading off the overflow oil emerging from between the contacting bearing surfaces of housing 38 and valve member 40, the distributor mechanism is further provided with an oil supply inlet connection 42 (FIGURE 6) for purposes of connection externally with the high pressure oil circulatory system of the axial piston unit, for example, with the oil flow supplied by the valving groove 18. In addition thereto, two oil discharge or outlet connections 43 and 44 are provided on both sides of inlet connection 42 which are connected by any suitable means such as pressure lines or pipes (not illustrated) with the connecting places 27 and 27' (FIGURE 2) provided at the back surface 26 of valving member 16 of which the connecting place 27 is shown in FIGURE 4. The connecting places 42, 43 and 44 formed in any suitable manner, for example, by tapped bores, which are disposed in the housing 38 adjacent one another all lead essentially horizontally in the direction of the axis of the rotary control valve member 40 by means of parallel connecting bores 45, 46 and 47 respectively.

The rotary control valve member 40 is provided with lubricant passage means comprising a cross bore 48 adjacent the place of termination of the connecting bore 45 and with further lubricant passage means comprising distributing bores 49, 50 and 51, 52 adjacent the place of termination of both connecting bores 46 and 47 respectively. The distributing bores 49 and 50 and the distributing bores 51 and 52 form in the respective transverse planes thereof through the control valve member 40 a right angle with each other and extend from the outside of the control valve member 40 to the longitudinal axis thereof. The two distributor bores 49, 50 and 51, 52 which are disposed at right angles to each other are arranged in their respective positions in such a manner that if disposed in a single transverse plane they would supplement each other to form two complete cross bores through the rotary control valve member 40 disposed at right angles to each other of which one cross bore would extend in parallel to the cross bore 48.

The connecting bore 45 is extended on the other side of the rotary control valve 40 a small distance by the coaxial portion 45' thereof and terminates thereat into a further bore 53 which extends upwardly perpendicularly thereto and which leads into a reservoir 54 within the housing 38. Furthermore, this reservoir 54 is in communication by means of further bores 55 and 56 with the two transverse planes in control valve member 40 in which the control bores 49, 50 and 51, 52 are arranged in such a manner that the further bores 55 and 56 extend essentially radially from above to the control valve member 40 at those places which lie within the vertical longitudinal central plane of the housing which contains within itself the axis of the control valve member 40.

*Operation*

The operation of the control valve distributor arrangement in accordance with the present invention described above is as follows:

In the positions indicated in FIGURES 5 and 6 of the rotary control valve member 40 the oil supplied by the high pressure oil circulatory system of the axial piston unit is in communication with the reservoir 54 over the connecting bore 45, the cross bore 48 of the control valve member 40, and the vertical bore 53 so that oil under pressure from the oil circulation system is forced into the reservoir 54 at a pressure corresponding to that of the high pressure oil circulatory system. Under these conditions there is no possibility for the discharge of the oil out of the reservoir 54 since the connecting bore 46, as illustrated in FIGURES 5 and 6, is not in communication with the distributor bores 49 and 50, on the one hand, and the bore 56 is not in communication with the distributor bores 51 and 52, on the other. Upon rotation of the rotary control valve member 40 by driving the pulley 39 about ninety degrees then, on the one hand, the oil supply to the reservoir 54 is cut off or blocked by interrupting the supply connection at the place of the cross bore 48 and, on the other hand, a communication for the oil discharge to the connecting bore 43 from the reservoir 54 is established over the bore 55, the distributor bores 49 and 50 of the control valve member 40 and the connecting bore 46. A connection of the reservoir 54 to the connecting place 44 in the housing 38, however, does not exist as the distributor bores 51 and 52 in this position of the rotary control valve member 40 do not establish any connection from the bore 56 to the connecting bore 57. After a further rotation of the rotary control valve member 40 by again ninety degrees in the same direction as before the connecting place 42 is again connected with reservoir 54 for supplying thereto the high pressure oil, and after another further ninety degrees rotation, i.e., with a rotation of a total of 270° with respect to that illustrated in FIGURES 5 and 6, in which the position of the rotary control valve member 40 was taken as zero degrees, the connecting place 44 is finally connected with the reservoir 54 over the connecting bore 47, the distributor bores 51 and 52, and the bore 56.

From the foregoing description of the operation of the distributor rotary control valve it becomes obvious that the connecting places 43 and 44 and therewith also the additional semiannular grooves 32, 33 and 32', 33', which are permanently connected therewith, are never directly in communication with the high pressure oil circulatory system of the axial piston unit but instead the additional semiannular grooves 32, 33 and 32', 33' are only supplied intermittently with an exactly metered expansion quantity of oil which in its magnitude depends on the size of the reservoir 54 as well as on the pressure differential between the oil pressure of the high pressure oil circulatory system and the oil pressure in the additional semiannular grooves 32 and 33.

While I have described one preferred embodiment, it is understood however, that the present invention is not limited to the embodiment described hereinabove and illustrated in the drawing but is suceptible of many changes and modifications within the spirit of the present invention. Thus, it is understood that the supply for the additional oil lubrication, especially in case of other co-operating surfaces which are also subjected to mutual high pressure loads may take place in another manner, for example, by a separate oil pump and preferably in a selectively engageable or disengagable manner or in any other adjustable and controllable manner.

In connection with a controllable axial piston unit, i.e., with a cylinder block of an axial piston unit which may be swung toward both sides of a center position coaxial with the drive shaft, in which the various control or valving grooves of the valving surfaces are each filled, depending on the particular control arrangement, either with pressure oil or with pressureless oil due to the pressure and suction portions thereof, it may also be appropriate to provide two annular grooves similar to the grooves 32, 32' and 33, 33' on both sides of the circular arc which contains the valving grooves corresponding to the grooves 18 and 19 for purposes of the additional auxiliary lubrication.

Of these four annular additional oil lubricating grooves, two additional oil lubricating grooves are provided on each side of the valving grooves, of which one may be intermittently connected to the valving groove or group of valving grooves which control the oil discharge or oil supply and the other to the valving groove or group of valving grooves which control the oil discharge or oil supply respectively. In such an arrangement a sufficient additional lubrication is made possible at all times even with controllable axial piston units.

I claim:
1. In a hydrostatic transmission, an axial piston type pump having a rotary barrel with pistons received therein, said pump comprising means including said barrel provided with surface means subjected to high pressure loads and forming sliding surfaces movable relative to one another, said pump comprising main lubricating means including groove means for supplying to said surface means subjected to relatively high pressure loads an amount of lubricant under pressure adequate to meet the requirements thereof under normal operating conditions, auxiliary lubricating means additional to said main lubricating means comprising auxiliary semi-circular groove means in said surface means of relatively smaller cross-section than said first-named groove means and disposed adjacent said first-named groove means for supplying additional lubricant to said surface means to provide adequate lubrication of said sliding surfaces especially under abnormal, adverse operating conditions such as during starting of said pump, said auxiliary lubricating means further comprising a stationary reservoir, first lubricant passage means connecting said first-named groove means with said reservoir for delivering high-pressure fluid to said reservoir, second lubricant passage means connecting said reservoir and said auxiliary-semi-circular groove means, rotary shaft means having passages therein which interrupt and connect said first and second lubricant passage means to provide periodic supplies of lubricant for said auxiliary semi-circular groove means.

2. In a hydrostatic transmission, an axial piston-type pump according to claim 1, wherein said auxiliary groove means extend throughout substantially 360°.

3. In a hydrostatic transmission, an axial piston-type pump according to claim 1, wherein said auxiliary semi-circular groove means comprises semi-circular grooves disposed radially outwardly and inwardly of said first-named groove means, and lubricant passage means connecting said radially outwardly disposed semi-circular grooves with said radially inwardly disposed semi-circular grooves.

4. In a hydrostatic transmission, an axial piston-type pump according to claim 1, wherein said means provided with surface means further includes a valving member, said valving member comprising passage means therethrough providing for the passage of high pressure fluid from said surface means on said valving member to the side of said valving member remote from said rotary barrel to bias said valving member toward said rotary barrel.

References Cited in the file of this patent

UNITED STATES PATENTS

| Re. 20,026 | Thoma | June 30, 1936 |
|---|---|---|
| 1,468,802 | Coleman | Sept. 25, 1923 |
| 1,839,592 | Reynolds | Jan. 5, 1932 |
| 1,867,308 | Durner | July 12, 1932 |
| 1,924,124 | Kuzelewski | Aug. 29, 1933 |
| 2,110,662 | Fisher | Mar. 8, 1938 |
| 2,272,771 | Hawley | Feb. 10, 1942 |
| 2,297,518 | Wegerdt | Sept. 29, 1942 |
| 2,298,850 | Vickers | Oct. 13, 1942 |
| 2,409,185 | Blasutta | Oct. 15, 1946 |
| 2,446,194 | Samiran | Aug. 3, 1948 |
| 2,449,297 | Hoffer | Sept. 14, 1948 |
| 2,465,954 | Wright | Mar. 29, 1949 |
| 2,685,254 | Muller | Aug. 3, 1954 |
| 2,716,944 | Ferris | Sept. 6, 1955 |
| 2,733,666 | Paulos | Feb. 7, 1956 |
| 2,735,407 | Born | Feb. 21, 1956 |
| 2,749,888 | Roos | June 12, 1956 |
| 2,751,749 | Newcomb | June 26, 1956 |

FOREIGN PATENTS

| 17,883 | Norway | Dec. 18, 1907 |
|---|---|---|
| 331,734 | Germany | Jan. 14, 1921 |
| 527,635 | Germany | June 4, 1931 |